July 14, 1925.
L. WHALEY
HORSESHOE
Filed Dec. 26, 1923
1,546,051
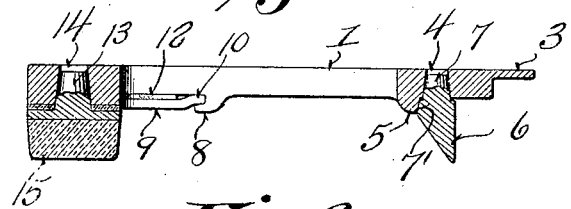
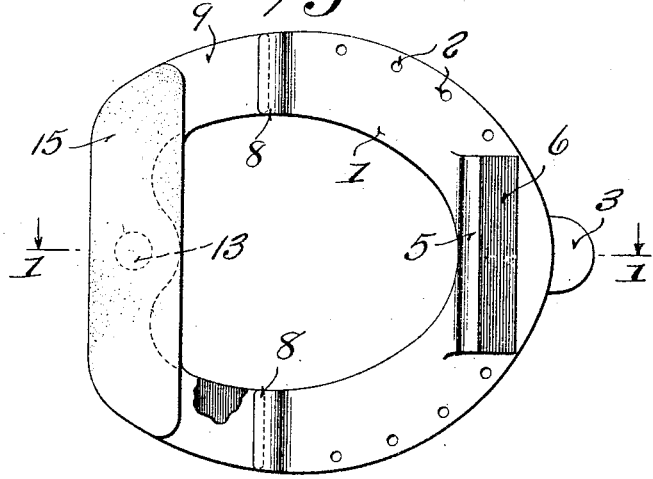
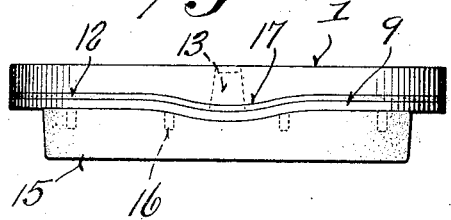

Patented July 14, 1925.

1,546,051

UNITED STATES PATENT OFFICE.

LOUIS WHALEY, OF MILWAUKEE, WISCONSIN.

HORSESHOE.

Application filed December 26, 1923. Serial No. 682,658.

*To all whom it may concern:*

Be it known that I, LOUIS WHALEY, a citizen of the United States, and resident of Milwaukee, in the county of Milwaukee and State of Wisconsin, have invented certain new and useful Improvements in Horseshoes; and I do hereby declare that the following is a full, clear, and exact description thereof.

This invention relates to horseshoes, and is particularly directed to a horseshoe adapted for winter service.

It is a matter of common knowledge that great difficulty has been experienced in driving horses upon sleety pavements or roadways due to the insecure footing attained by the horse, and the consequent danger of falling and also due to the relatively severe repeated jar transmitted to the horse's foot due to the breaking of small portions of the ice or slipping of the horse's feet. This is especially true when horeshoes provided with sharpened calks are employed as these calks cut through the ice and are suddenly arrested by contacting either with the firmer portion of the ice or with the solid portion of the pavement. In other words, the horse's feet are subjected to a multitude of relatively severe jolts when the shoe is equipped with calks and when the horse is driven over a sleety pavement. This invention is designed to overcome the above-noted defects.

The objects of this invention are to provide a horseshoe which may be readily attached to the hoof in the usual manner, which is equipped with a removable front calk adapted to bite into the ice or other slippery material, which is provided with a resilient heel portion to afford a substantial cushioning action, which is provided with means normally retaining the cushioned heel and the front calk in position, but which is so constructed as to permit the ready removal and replacing of either the front calk or the resilient heel portion.

Further objects are to provide means for securing a wedging action with reference to the removable cushioned heel portion, or the front calk, so that when weight is placed upon the shoe these portions will be even more firmly attached to the body portion of the shoe.

An embodiment of the invention is shown in the accompanying drawings, in which:—

Figure 1 is a vertical sectional view taken longitudinally of the horseshoe, such view corresponding to a section on the line 1—1 of Fig. 2;

Fig. 2 is a bottom plan view of the shoe; and

Fig. 3 is a rear view thereof.

The shoe comprises a main body portion 1, which may be provided with a plurality of nail-receiving openings 2, and with a front lip 3 adapted to be folded up against the front of the horse's hoof when the shoe is applied. This body portion is in effect a continuous ring and extends in unbroken continuity completely around the outline of the hoof, as shown in Fig. 2. It is provided adjacent its front portion with a tapered aperture 4 and with a downwardly extending projecting or thickened portion 5 provided with a tapered front face. A removable front calk 6 of material extent is provided and is equipped with a tapered pin 7 adapted to fit within the tapered aperture 4. This calk is also provided with a tapered rear face 7' adapted to wedge against the tapered portion of the lug or thickened part 5 of the shoe. This calk, it will be seen, wedges both in the aperture 4 and against the tapered face described above and thus is securely retained in position upon the under side of the body portion, and is prevented from turning by contacting with the thickened portion 5 which, as may be seen from Fig. 2, extends the full width of the front calk 6. However, this front calk may be readily removed by inserting an instrument between the calk and the body portion 1 and prying it loose and a new calk may be instantly substituted.

A pair of rearwardly extending lugs 8 are carried by the lower face of the body portion 1, as shown in Figs. 1 and 2, and are spaced a slight distance from the body portion. They are preferably located slightly rearwardly of the transverse center line.

A U-shaped piece 9 is provided which approximately conforms to the contour of the body portion from one lug 8 around the rear portion of the shoe to the other lug 8. This member 9 is provided with slightly offset ends 10 which are adapted to fit beneath the lugs 8, as indicated in Fig. 1. A piece of rubber or other yielding material 12 is interposed between the member 9 and the body portion 1. This member 9 is provided approximately centrally with an upstanding tapered pin or lug 13 which fits and wedges within a correspondingly tapered aperture 14 formed in the body portion 1. The relative proportions of the parts are such that the ends 10 wedge beneath the lugs 8 when the pin 13 is forced into position, thus causing a binding action to occur and aiding in firmly and securely retaining the member 9 in position. The member 9 is provided with an elongated rubber pad or rubber heel 15 which is vulcanized in place upon the lower side of the member. This rubber heel may be roughened on its under side by suitable projections or ribs. If desired, the member 9 may be provided with a plurality of projections 16 (see Fig. 3) which aid in the attaching of the rubber heel 15 in position during vulcanizing.

It is to be noted from reference to Fig. 3 that the body portion 1 is provided centrally of its rear part with a downwardly curved enlargement 17, and that the strap member 9 is similarly curved. This aids in securely holding the body portion and the member 9 in their relative positions and prevents slipping of one of the parts with relation to the other, such curved portions, in other words, aiding the pin 13 in retaining the member in place.

In using this horseshoe it has been found that the front calks provide an excellent grip upon the icy street and that the cushioned heel 15 aids in such action. Further than this, the shock which is incident to driving over an icy pavement is taken up by the cushioned heel portion of the shoe and consequently lameness does not result. The cushioning strip 12 prevents clattering of the shoe as it forms a padding between the member 9 and the body portion.

It will thus be seen that a horseshoe has been provided which is eminently suited for winter use, which will insure a firm and secure grip upon an icy surface, and which will relieve the horse of a large amount of unnecessary and undesirable jarring.

Although the invention has been described in considerable detail, it is to be understood that the invention may be variously embodied, and is therefore to be limited only as claimed.

I claim:

1. A horseshoe comprising a ring-like body portion having a rear tapered aperture, a U-shaped member positioned beneath the rear of said body portion and having an upwardly extending tapered pin adapted to be positioned within said rear aperture, lugs carried by said body portion and engaging the front of said U-shaped member, and a resilient heel portion secured to said U-shaped member.

2. A horseshoe comprising a ring-like body portion having a rear tapered aperture, a U-shaped member positioned beneath the rear of said body portion and having an upwardly extending tapered pin adapted to be positioned within said rear aperture, lugs carried by said body portion and engaging the front of said U-shaped member, a resilient heel portion secured to said U-shaped member, and a cushioned strip positioned between said U-shaped member and said body portion.

In testimony that I claim the foregoing I have hereunto set my hand at Milwaukee, in the county of Milwaukee and State of Wisconsin.

LOUIS WHALEY.